UNITED STATES PATENT OFFICE 2,582,327

PROCESS FOR POWDERING POLYETHYLENE

Walter A. Haine, Woodbridge, N. J., assignor, by mesne assignments, to Union Carbide and Carbon Corporation, a corporation of New York No Drawing. Application July 23, 1949,
Serial No. 106,491

11 Claims. (Cl. 18—47.5)

This invention relates to a process for powdering polyethylene. Such material is a tough plastic, having good thermal insulating qualities, and a large percent elongation before its ultimate strength in tension is reached. These characteristics have made it one of the most difficult plastics to grind to powder in the usual mill, especially when said material is of high molecular weight. If an impact mill is used the energy creates heat that is not easily dissipated and the material melts from the heat generated by impacts before the desired fineness is attained. In a shearing operation, the toughness and elongation of the material prevent a good shearing action; instead of sharply sheared particles, elongated, feathery pieces result. A suggestion for powdering the material has been to use an aliphatic alcohol to embrittle it prior to grinding. The higher molecular weight polyethylene is not embrittled by alcohol, so this last suggestion is applicable only to the lower and not to the higher molecular weight polyethylene, which is the more difficult to grind.

An object of this invention is the provision of a process for powdering polyethylene at a reasonable cost in time and materials. Another object is to provide such a process which is especially adapted for powdering high molecular weight polyethylene. A further object is to provide an inexpensive process for making a porous polyethylene powder. Still another object is to provide a simple process for changing feathery fibrous particles of polyethylene into more nearly spherical pellets of higher apparent density.

According to this invention a simple and inexpensive method has been discovered for pulverizing polyethylne. The material in pieces appropriately sized for a Banbury mixer is heated to its softening temperature in such a machine. A few percent of water or other substantially inert liquid is added and intimately mixed into the plastic mass. Such liquid should have a vaporizing temperature adjacent to and slightly below the melting temperature of the polyethylene. The precise explanation of what happens is not certain, but it is thought the widely distributed particles of water vaporize and absorb considerable heat from the material, thereby causing the plastic to become porous or spongy and at least locally cooled to below its softening temperature.

As used herein, the "softening temperature" is the temperature range in which the polyethylene softens sharply from a tough solid to a soft or viscous plastic mass, sometimes called the melting temperature.

While operating the mixer, the temperature of the material is next dropped say 20 or 30 degrees centigrade, effecting a tearing and shredding of this porous material. The recondensed water particles are thought to function as a lubricant, perhaps wetting the particles of material and reducing the generation of heat from grinding friction, and thus preventing the resin from becoming plastic again too quickly. The particles of material thus formed are not globular but rather appear as elongated shreds and fibers with low apparent density.

Raising the temperature of the material by 15 or 20 degrees or to substantially 100° C., but below the softening point of the material, is effective to reduce the size and bulk of such particles. It is thought that at this higher temperature internal stresses of the elongated and oriented particles in the material are relieved, causing a shortening of said shreds into particles of more nearly globular form with higher apparent density.

The following examples will aid in attaining a better understanding of this invention:

Example 1

Ninety pounds of polyethylene having a molecular weight of 22,000 to 23,000 determined by Williams plasticity test, and a softening temperature of about 110° C., in pieces of appropriate size, resulting from shearing short quarter or half inch lengths from rods about $\frac{3}{16}$ of an inch in diameter, was loaded into a Banbury mixer of a size adapted to hold 100 pounds of the material and having water cooled rotors revolving at a speed of 33 R. P. M. A pneumatic ram on the mixer was adjusted to subject the polyethylene to a pressure of 40 to 60 pounds per square inch. The material reached its softening temperature in about 4½ minutes without the addition of extraneous heat, the only source of heat being the friction resulting from the action of the mixer upon the material. The fact that the material had "fluxed" or become "melted" was indicated by a sucking sound in the mixer and also by a temperature indicator actuated by a thermocouple projecting into the mixer from its casing. The temperature indicated was 110° C. although the material might have been a few degrees hotter. The attainment of a higher temperature than that at which the material "melts" is not necessary.

When the sharp softening temperature of the material had been reached as indicated above, the second or cooling portion of this process was begun. The ram on the mixer was raised to release pressure and 1.8 pounds of water was poured into the mill. To allow the material to cool while the water was being intimately mixed into the material, the ram was lowered to exert pressure on the material for only brief periods, interrupted by periods during which the intensity of the fluxing action of the mixer was reduced by raising the ram to release pressure on the material. With the ram down 10 seconds and up 10 seconds, the temperature of the material dropped in about 2½ to 3 minutes to 80° C. It was observed that if the pressure were applied to the material too long its temperature would rise again to its softening point. Cooling water was circulated through the mixer rotors and jacket to aid in lowering the temperature. When ground in this manner, the material became spongy, was stretched and shredded into small, discrete, feathery, and fibrous appearing elongated particles which had apparently been pulled apart by the mixer.

The third and last step of this process involved shrinkage of the particles of material by relief of the stresses in them. For this purpose circulation of cooling water in the mixer rotor was stopped and operation of the Banbury continued, with the ram down, until the heat put into the material by the mechanical operation of the mixer caused the material temperature to rise to 100° C. as shown by the temperature indicator. Unlike the first heating step, this second heating step took about 8 minutes. At a temperature above 90° C. and probably between 95° C. and 100° C. internal stresses within the material were relieved and the particles shortened.

After reaching about 100° C. and shrinking, the particles of material were removed from the machine. 69½ percent of the material was found to be capable of being passed through a 20-mesh screen, i. e. one having openings about one thirty-second inch square; 34 percent of the material was much finer and capable of passing through a 50-mesh screen having openings about 0.01 inch square. The 30½ percent of the material which did not pass through the 20-mesh screen was subjected to a further treatment which varied somewhat from that to which the original was subjected.

For retreatment, the material was not "melted" because it already contained pores and consisted in the main of aggregates of particles partly fluxed from the previous treatment. One hundred pounds were loaded into the same Banbury together with three pounds of water, thus loading the mill to capacity. The ram was lowered to apply the same 40 to 60 pounds per square inch of pressure. When the temperature of the material reached 100° C. the ram was raised, removing pressure, for 20 seconds, then lowered for 10 seconds, and this cycle was repeated three to four times. During this operation the mixer reduced all aggregates to discrete particles and provided enough heat to cause shrinkage of all elongated particles. The water prevented the agglomeration of the particles. The temperature of the material was allowed to rise to 100° C., whereat most of the water vaporized. The material was discharged from the mixer, and it was found that 75.9 percent of the retreated material passed through a 20-mesh screen and 46 percent of it passed through a 50-mesh screen.

*Example 2*

Ninety pounds of the polyethylene material mentioned in the previous example was brought to its softening temperature in the same way. Water, 3.6 pounds, (twice as much as previously used) was poured into the mixer and intimately mixed into the material. The 80° C. temperature was reached more quickly because the larger quantity of water effected a more rapid cooling. The chief difference, however, from the first example was that in returning to 100° C. for stress relief, 25 to 30 minutes were required, due to the greater cooling and perhaps to the greater lubrication afforded by the larger quantity of water. While a much larger percent of fine material resulted from the use of the larger quantity of water, it is thought the process of this Example 2 is less desirable commercially than Example 1 using retreatment, due entirely to the much longer time required to bring the material up to 100° C. from the 80° temperature.

*Example 3*

Fixe pounds of polyethylene having a molecular weight of 12,000, a viscosity of $4 \times 10^3$ poises at 130° C., and a softening temperature of 85° C., were loaded into a Banbury having an 8-pound capacity. With a ram pressure of 60 pounds per square inch, 3½ minutes were required to bring the material up to its softening temperature of 85° C. When "melted," 3 percent by weight of water was added. Five minutes were required to effect a temperature drop in the material to 60° C. in the same manner as mentioned before, namely, by short alternate periods of high and low pressure on the material in the mixer. Upon reaching this lower temperature the material was then allowed to heat up to 80° C. for stress relief and shrinkage of the elongated shreds of the material. Five minutes were required in raising the temperature to 80° C. from 60° C.

Upon discharge of this material from the Banbury, it was found that 88.7 percent of the material passed through a 20-mesh screen, 69 percent of the mill load passed through a 35-mesh screen (one sixty-fourth inch openings), and 31 percent through a 100-mesh screen (about six-thousandths inch openings). Only 11.3 percent was retained on the 20-mesh screen.

While favorable results appear to have been achieved in this Example 3 without vaporization of the water, such is believed to have been due to the fact that these lower molecular weight polyethylenes are less difficult to pulverize without maximum vaporization of the cooling water than the higher molecular weight material of Example 1. When powdering the higher molecular weight material of Example 1 using a coolant that vaporized above 110° C. less favorable results were obtained than were found when the cooling liquid did vaporize and expand the material to some extent. Any cooling liquid may be used for the process of this invention, provided said liquid is relatively inert to the material being powdered. Preferably such inert cooling liquid should have a boiling temperature below but only slightly below the melting temperature of the material to insure vaporization of the liquid within the material and at least some expansion or swelling of the pores in which the vaporized coolant is enclosed. The available space in the Banbury mixer need not be great and the swelling of the material due to the pore enlargements may be correspondingly limited, although some limited swelling is desirable. If the cooling liquid has a vaporizing temperature too far below the melting point of the material then a considerable quantity of the liquid may be vaporized and lost before it gets worked into the material. Ethyl and isopropyl alcohols have been used as the coolants with the lower softening material of Example 3 and were found to produce satisfactory results; but the weight of isopropanol or ethyl alcohol needed was three times the weight of water. Other coolants appropriate for the process of Example 1 include butanol and propanol.

The process of this invention is especially adapted for pulverizing those high molecular weight polyethylenes having softening temperatures over 100° C. It is these materials which have in the past been most difficult to pulverize. And it is these materials which are especially adapted for use with water as an inexpensive coolant.

Additives may be mixed with the material when in melted condition before the coolant liquid is added, for instance, pigments, anti-oxidants, lubricants, etc.

What is claimed is:

1. A process for powdering polyethylene which comprises heating said material to its softening temperature, mechanically working into and distributing throughout the softened material a non-solvent cooling liquid which is inert to the material, reducing the temperature of said material to below that at which said material is resilient, and mechanically shredding and breaking up said material in the presence of said liquid to form elongated, fibrous-appearing, feathery particles, at such reduced temperature, whereby said liquid at least to some extent lubricates the shredding operation.

2. A process according to claim 1, wherein said elongated particles are shrunk by heating them to a stress-relieving temperature below said softening temperature, said heating being effected by mechanically working the said particles in the presence of said liquid coolant.

3. A process according to claim 1, wherein said liquid coolant is water.

4. A process according to claim 2, wherein said coolant is water.

5. A process for powdering polyethylene which comprises heating polyethylene to its softening temperature, mechanically working an inert liquid coolant into the polyethylene, shredding the polyethylene at a temperature below a stress-relieving temperature, and shrinking the shredded particles of material by heating them to a stress-relieving temperature below said softening temperature.

6. A process according to claim 5 in which said shrinking is effected by mechanically working the particles in the presence of an inert liquid.

7. A process of reducing the size and especially the length of shredded particles of polyethylene containing tensile stresses thereby increasing their apparent density which comprises heating said particles to a stress-relieving temperature, said heating being accomplished by mechanically working the particles in the presence of an inert liquid to maintain discrete particles.

8. A process for powdering polyethylene material which comprises heating said material to its softening temperature, mechanically working into and distributing throughout the softened material an inert cooling liquid, reducing the temperature of said material to below that at which said material is resilient, mechanically shredding and breaking up the material at such reduced temperature in the presence of said cooling liquid to form elongated, fibrous appearing, feathery particles, and shortening the length of such elongated, fibrous appearing, feathery particles by heating said material to a temperature at which the material is resilient but below that at which the material softens.

9. A process according to claim 8 in which said polyethylene material has a softening temperature below the boiling point of the cooling liquid at substantially atmospheric pressure.

10. A process according to claim 8 in which said polyethylene material has a softening temperature above 100° C. and in which the cooling liquid has a boiling point below the softening temperature of the material.

11. A process according to claim 8 in which about 1% to 4% by weight of the inert cooling liquid is used.

WALTER A. HAINE.

REFERENCES CITED

The following references are of record in the file of this patent:

UNITED STATES PATENTS

| Number | Name | Date |
| --- | --- | --- |
| 2,234,994 | Vernon et al. | Mar. 18, 1941 |
| 2,241,441 | Bandur | May 13, 1941 |
| 2,419,035 | Quinn et al. | Apr. 15, 1947 |